(12) United States Patent  
Carver et al.

(10) Patent No.: US 7,416,628 B2
(45) Date of Patent: Aug. 26, 2008

(54) LABEL APPLICATOR SYSTEM WITH A PEEL INHIBITING APPARATUS FOR RFID LABELS

(75) Inventors: Ian Carver, Naperville, IL (US); Troy Herman, Barto, PA (US)

(73) Assignee: Videojet Technologies, Inc., Wood Dale, IL (US)

( * ) Notice: Subject to any disclaimer, the term of this patent is extended or adjusted under 35 U.S.C. 154(b) by 450 days.

(21) Appl. No.: 11/147,820

(22) Filed: Jun. 8, 2005

(65) Prior Publication Data

US 2005/0274458 A1 Dec. 15, 2005

Related U.S. Application Data

(60) Provisional application No. 60/579,271, filed on Jun. 14, 2004.

(51) Int. Cl.
*B32B 38/10* (2006.01)

(52) U.S. Cl. ............... 156/249; 156/344; 156/541; 156/542; 156/584

(58) Field of Classification Search ............... 156/249, 156/344, 584, 541, 542
See application file for complete search history.

(56) References Cited

U.S. PATENT DOCUMENTS

| | | | |
|---|---|---|---|
| 4,840,694 A * | 6/1989 | Brookman et al. ............ 156/344 |
| 5,229,587 A | 7/1993 | Kimura et al. |
| 5,816,718 A | 10/1998 | Poole |
| 5,978,004 A | 11/1999 | Ehrhardt |
| 6,019,865 A * | 2/2000 | Palmer et al. ............... 156/265 |
| 6,028,518 A * | 2/2000 | Rankin et al. ............ 340/572.1 |
| 6,369,878 B1 | 4/2002 | Zevin et al. |
| 6,645,327 B2 * | 11/2003 | Austin et al. ............... 156/64 |
| 6,766,844 B1 * | 7/2004 | Watkins ....................... 156/584 |
| 6,942,403 B2 * | 9/2005 | Hohberger et al. ..... 400/120.01 |
| 7,176,799 B1 * | 2/2007 | Golicz et al. ............ 340/572.1 |
| 2002/0062898 A1 | 5/2002 | Austin et al. |
| 2006/0249240 A1 * | 11/2006 | Dijkstra ....................... 156/64 |
| 2007/0284049 A1 * | 12/2007 | Ford et al. .................. 156/541 |

FOREIGN PATENT DOCUMENTS

| | | |
|---|---|---|
| DE | 31 52 881 A1 | 7/1983 |
| EP | 0 800 995 A | 10/1997 |
| WO | WO 01/00492 A | 1/2001 |
| WO | WO 03/084817 A | 10/2003 |

OTHER PUBLICATIONS

Zebra Alchemy Print Engine, http://www.rfid.zebra.com/alchemy.htm, Jun. 11, 2004.

* cited by examiner

*Primary Examiner*—Mark A Osele
(74) *Attorney, Agent, or Firm*—McAndrews, Held & Malloy, Ltd.

(57) ABSTRACT

An apparatus and method for inhibiting the peeling of labels from a web is disclosed. A web with a plurality of labels is pulled towards a peeling edge. An antenna examines at least one of the labels. Based at least in part on the antenna's examination of at least one label, one or more of a peel inhibiting device and a peeling edge is moved towards or away from the other. The combination of the edge and device forms a rounded surface over which the web and labels are pulled. As the web and label(s) pass across the combination of the edge and device, the separation of at least one of the labels from the web is inhibited.

19 Claims, 6 Drawing Sheets

LABEL APPLICATOR SYSTEM WITH A PEEL INHIBITING APPARATUS FOR RFID LABELS

RELATED APPLICATIONS

This application claims the benefit of U.S. Provisional Application No. 60/579,271, filed Jun. 14, 2004, titled "Label Applicator System with a Peel Inhibiting Device for RFID Labels." The disclosure of the '271 application is hereby incorporated in its entirety.

FEDERALLY SPONSORED RESEARCH OR DEVELOPMENT

Not applicable.

BACKGROUND OF THE INVENTION

The present invention generally relates to label applicator for applying labels to one or more surfaces. In particular, the present invention relates to a system and method for inhibiting peeling of a radio frequency identification ("RFID") label from a label web.

Current packaging and labeling systems provide apparatuses and methods for applying labels to surfaces of packages in a singular or assembly line fashion. Typically, a label application apparatus includes a web unwind reel, a substrate with several labels adhered to the substrate, a peeling edge and a waste rewind reel. The substrate is commonly referred to as a web. The peeling edge may be any elongated edge over which the web may be pulled. For example, the peeling edge may be a single surface area or corner edge of a rectangular bar.

The web and labels are supplied from the unwind reel. The web is pulled in a linear direction towards the peeling edge, across the edge, and back towards the waste rewind reel. The waste rewind reel or a drive spool adjacent to the rewind reel may provide the pulling force required to pull the web from the unwind reel, across the peeling edge and onto the waste rewind reel.

Labels are separated from the web as the web is pulled across the peeling edge. Typically, the web is pulled towards the peeling edge from the unwind reel at an acute angle. Similarly, the web is pulled from the peeling edge towards the waste rewind wheel at an acute angle. By pulling the web across the peeling edge at an acute angle and/or by pulling the web back from the peeling edge at an acute angle, as the web crosses the peeling edge and is pulled back towards the waste rewind reel, the label separates from the web. The label may then be placed on a surface of a package located under the peeling edge.

Generally, labels are used to store and/or provide identification information. The information may include any one or more of the contents of a package, a manufacturer or pricing information, for example. Current systems may use a barcode printed on the label to provide identification information. Once the barcode has been printed on the label and the label has been applied to a package, a scanner may be used to retrieve information associated with the barcode.

Other systems may utilize RFID tags or labels to store and obtain identification information from a package. RFID tags are more complex than barcode labels. RFID tags allow a user to identify unique items, such as identification information for example, using radio waves. A typical RFID tag operates by communicating with a reader or antenna. The antenna may transmit an encoding signal, transmit a read signal and/or receive a response signal.

RFID tags usually include a microchip upon which digital information may be stored. However, RFID tags may instead include material that reflects back a portion of incoming radio waves towards an antenna.

In operation, an antenna is placed near the web and RFID labels as they are pulled from the unwind reel to the peeling edge. As the labels pass under the antenna, the antenna may transmit an encode signal. The encode signal may include, for example, identification information to be stored in the RFID label before placing the label on a package.

The antenna may also transmit a read signal to an RFID tag. The read signal may be a signal attempting to read information stored in the RFID tag. For example, the RFID tag may include a transponder that transmits a response signal when a read signal is received. For example, after an antenna transmits a read signal to the RFID tag, a transponder replies by transmitting a response signal to the antenna. The response signal may include identification information. Based at least in part on this response signal, the antenna may determine that the tag is either "good" (for example, the tag is properly encoded and is readable by the antenna) or "bad" (for example, the tag is improperly encoded and/or is un-readable by the antenna).

After the label has passed the antenna, the label is peeled from the web and applied to a package, as described above. However, the RFID tag may be a bad tag. A bad tag may be a tag where either antenna is either unable to properly encode the tag or unable to read information from the RFID tag. For example, the encode signal sent from the antenna to the RFID tag may not be received properly at the tag. This may cause the microchip in the tag to be encoded improperly. A tag may not be encoded properly when the microchip does not contain essential identification information that was transmitted to the tag. Alternatively, the RFID tag may not properly respond to a read signal transmitted by the antenna. For example, after transmitting a read signal to the tag, the antenna may receive a corrupted response signal or no response signal at all from the tag. In either of these situations, the RFID tag is a bad tag and may not allow for later users to read the proper information from the label or tag.

Yet, current label application systems apply the label to the surface of a package regardless of whether the RFID tag is a bad tag or not. Current systems pull the web with one or more bad RFID tags past the antenna to the peeling edge, where the bad tag is separated from the web and placed onto a package. Because of this application of bad labels without regard to whether the tag is a good or bad tag, several packages may be affixed with labels that either contain incorrect identification information or are unable to be read by an antenna or scanner.

Thus, a need exists for an apparatus and method for inhibiting the peeling of bad RFID labels from a web. Such an apparatus and method can decrease the number of bad RFID tags that are peeled from a web and applied to a package. The apparatus and method can reduce the number of packages with incorrect or unreadable identification labels, thus increasing the accuracy and reliability of a package labeling system.

BRIEF SUMMARY OF THE INVENTION

The present invention provides a peel inhibiting apparatus for inhibiting peeling of labels from a web. The apparatus includes a peeling edge and a peel inhibiting device. The peeling edge is configured to separate labels from the web when the web is pulled across the peeling edge. The peel inhibiting device is configured to combine with the peeling edge to form a peel inhibiting surface. The peel inhibiting surface is configured to prevent labels from separating from the web when the web is pulled across the edge.

The present invention also provides a method for inhibiting peeling of one or more labels from a web. The method includes pulling a web that includes a plurality of labels adhered thereon towards a peeling edge and inhibiting separation of one or more of the labels from the web by forming a peel inhibiting surface at the peeling edge.

The present invention also provides system for applying labels. The system includes an antenna and a peel inhibit apparatus. The antenna is configured to examine at least one of the labels adhered to a web for proper encoding. The peel inhibit apparatus is configured to separate properly encoded labels from the web and to prevent improperly encoded labels from the web based on an examination of the labels by the antenna. The peel inhibit apparatus includes a peel inhibiting device and a peeling edge. At least one of the device and edge is configured to move towards the other in order create a rounded surface capable of preventing properly

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 7:
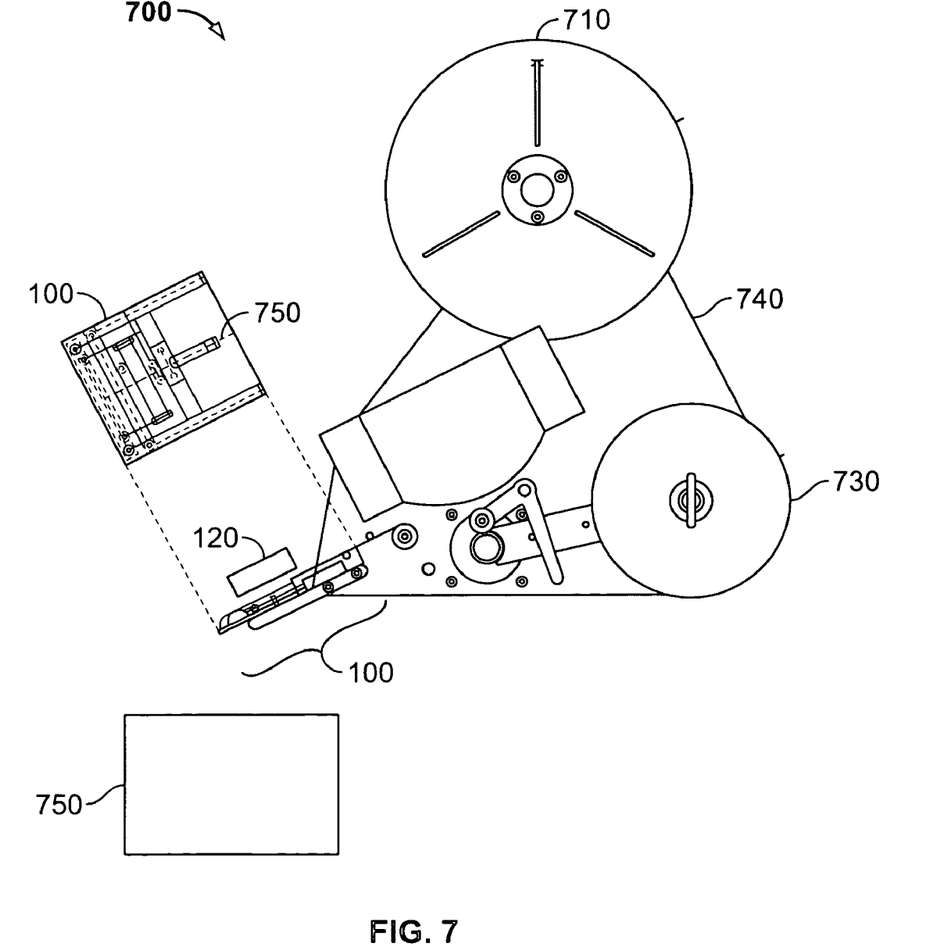
FIG. 7 illustrates the label applicator system used in accordance with an embodiment of the present invention.

FIG. 7 illustrates the label applicator system 700 used in accordance with an embodiment of the present invention. Applicator system 700 includes a label unwind spool 710, an antenna 120, a peel inhibitor apparatus 100, a waste rewind spool 730 and a printer 740. One or more packages 750 may pass below applicator system 700 in order that one or more labels attached to a web may be applied to a surface of the packages 750.

Figure 1:
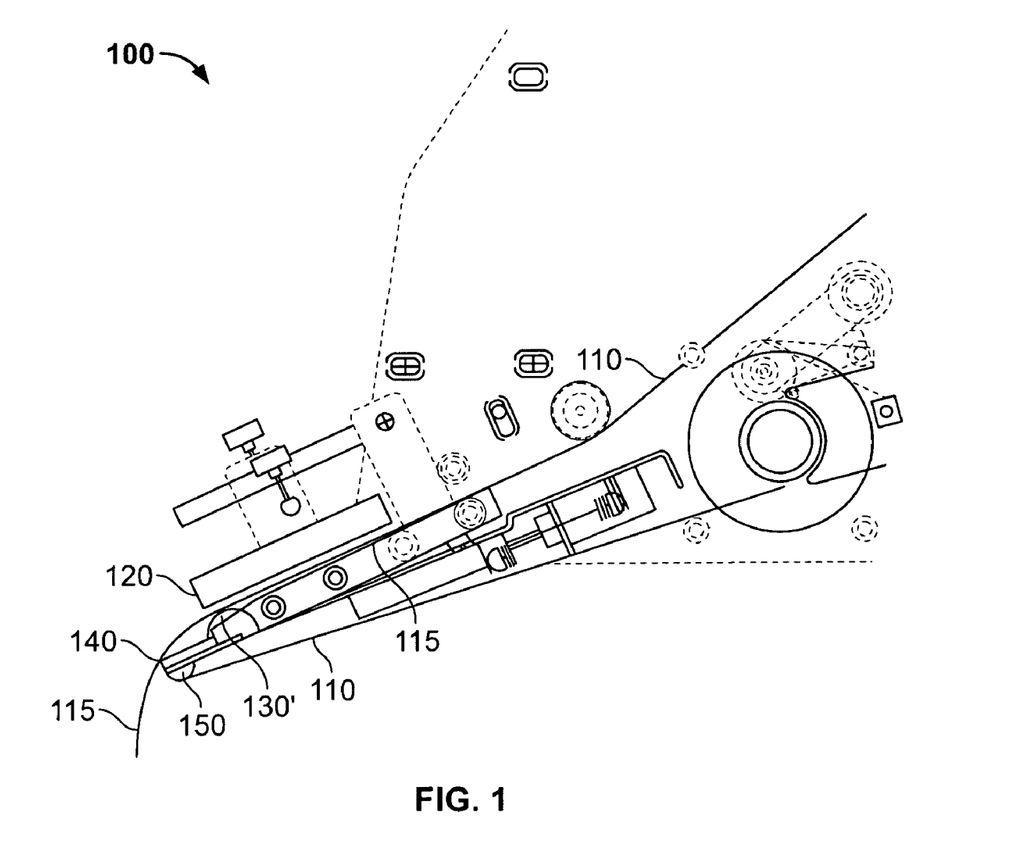
FIG. 1 illustrates a peel inhibitor apparatus of a label applicator system used in accordance with an embodiment of the present invention.

FIG. 1 illustrates peel inhibitor apparatus 100 of label applicator system 700 used in accordance with an embodiment of the present invention. Peel inhibit apparatus 100 includes a label web 110, an antenna 120, a peel inhibiting device 130 and a peeling edge 140. Label web 110 includes a plurality of labels 115. Labels 115 may include an RFID tag. Labels 115 are adhered to web 110. Peeling edge 140 may include a half-cylinder bar 150 located underneath peeling edge 140. Peel inhibiting device 130 may include a half-cylinder bar with an equivalent or different radius than bar 150.

In operation, web 110 is wound around label unwind or supply spool 710. The unwind spool acts as a supply or source of web 110 and labels 115 to apparatus 100. Web 110 extends from unwind spool 710 to peeling edge 140. After passing peeling edge 140, web 110 may extend to waste rewind spool 730. Waste rewind spool 730 winds up web 110 for disposal. Typically, a drive roller is used to pull web 110 through apparatus 100 to waste rewind spool 730. The drive roller may be located adjacent to waste rewind spool 730 so as to cause web 110 to be wound around the waste rewind spool. Alternatively, waste rewind spool 730 may be independently rotated to wind up web 110 and any labels 115 that are not applied to a package. Printer 740 may be employed to print one or more labels 115 before labels 115 pass through apparatus 100.

In order to apply labels 115 to a package, web 110 is pulled from unwind spool 710 towards peeling edge 140. As web 110 is pulled, web 110 and labels 115 pass under antenna 120. Antenna 120 may encode and/or examine a single or multiple labels 115. Antenna 120 may encode a RFID located in a label 115 by transmitting an encode signal to a transponder in the RFID, as described above. The encode signal may include, for example, identification data, such as a 28-digit serial number including information such as a product identification or a manufacturer's reference number.

After antenna 120 transmits the encode signal to the RFID, antenna 120 may then transmit a read signal to RFID, as described above. The read signal may request a transponder in the RFID transmit data to antenna 120, for example. The read signal may therefore attempt to read the data transmitted to the RFID via the encode signal, for example.

Once the transponder receives the read signal, the transponder may transmit a response signal to antenna 120. The response signal may include, for example, a portion or the entirety of the data contained in the encode signal. When antenna 120 receives the response signal, antenna 120 may compare the response signal to an expected signal in order to verify the encoding of label 115. The expected signal is a combination of data that a transponder in a label 115 should be transmitting when a read signal is transmitted to the transponder. Therefore, if antenna 120 transmits a proper encoding signal, a transponder in a label properly receives the encoding signal, antenna 120 transmits a proper read signal, the transponder receives the read signal and transmits a proper response signal, and antenna 120 receives the response signal and determines that the response signal matches the expected signal, the RFID has been properly encoded.

If the RFID in a label 115 has been properly encoded, web 110 and the label 115 can continue to be pulled towards peeling edge 140. Once web 110 and the label 115 reach peeling edge 140, web 110 may continue to be pulled at a sharp or acute angle back towards waste rewind reel 730. Due to the angles that web 110 and label 115 are pulled towards peeling edge 140 and back towards waste rewind reel 730, the properly encoded label 115 may be separated from web 110. Once the label 115 is separated from web 110, the label 115 may be adhered to package 750, for example.

Figure 2:
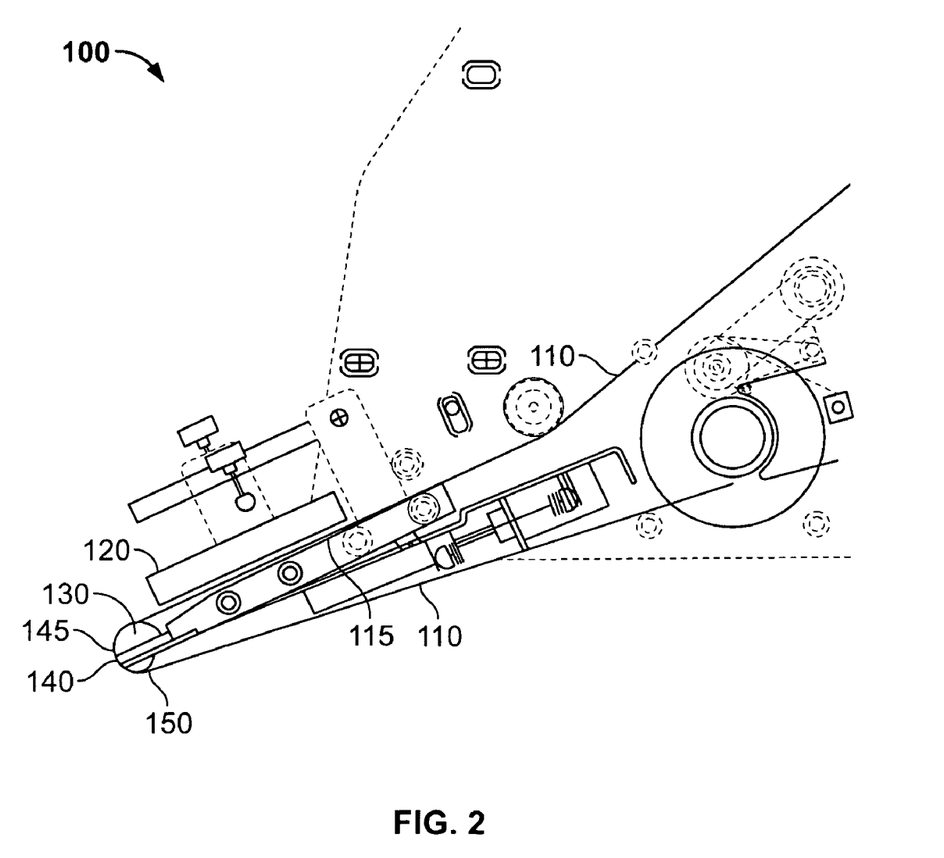
FIG. 2 illustrates the peel inhibitor apparatus of the label applicator system used in accordance with an embodiment of the present invention.

FIG. 2 illustrates peel inhibitor apparatus 100 of label applicator system 700 used in accordance with an embodiment of the present invention. The embodiment of apparatus 100 illustrated in FIG. 2 may apply when antenna 120 determines that a label 115 has not been properly encoded or that the label 115 cannot be read by antenna 120. As described above, such a label 115 may be a bad label 115.

Apparatus 100 can prevent the bad label 115 from separating from web 110 and being applied to package 750. For example, bad label 115 may not have been properly encoded as an error in any one of the encode, read or response signals may reveal an error in any one of antenna 120, the RFID or the transponder in the label 115. Similarly, bad label 115 may have a transponder that is incapable of being read or of transmitting a response signal, for example. Bad label 115 may therefore be improperly encoded and should not be applied to package 750, for example.

After antenna 120 determines that label 115 is bad, peel inhibiting device 130 is driven towards peeling edge 140. For example, device 130 may be linearly driven towards edge 140. However, peel inhibiting device 130 may be driven towards peeling edge 140 for other reasons, including a lack of any packages 750 to which labels 115 may be applied, for example. Device 130 may be driven by any known method, including through the use of a solenoid and an electrical signal. Device 130 may also be driven by any mechanical method, including through the use of a spring or air pressure. Device 130 may be driven over a rail guide. For example, device 130 may translate towards and away from peeling edge 140 by riding along one or more rails.

In an embodiment, device 130 may include a pair of rail guides and rest on a pair of rails. When antenna 120 determines that a label 115 is bad, antenna 120 may send an electrical signal to a solenoid connected to device 130. Activation of the solenoid may then cause device 130 to be linearly driven towards peeling edge 140, for example.

Once device 130 is located at peeling edge 140, a combination of device 130 and bar 150 creates a peel inhibiting surface 145 at peeling edge 140. Peel inhibiting surface 145 may include a rounded surface or any other geometric shape capable of preventing one or more labels 115 from separating from web 110. For example, surface 145 may include a portion of a circle.

In an embodiment, device 130 and bar 150 may have equivalent radii. In another embodiment, device 130 and bar 150 have different radii.

In an embodiment, peel inhibiting surface 145 at peeling edge 140 includes a radius that is constant over the entire periphery of device 130 and bar 150.

In another embodiment, peel inhibiting surface 145 at peeling edge 140 includes a radius that is not constant over the entire periphery of device 130 and bar 150.

Surface 145 may prevent a bad label 115 from separating from web 110. Surface 145 may decrease the angles at which web 110 and bad label 115 are pulled over device 130 and bar 150, for example. Bad label 115 may therefore remain adhered to web 110 as web 110 passes over device 130 and bar 150. Web 110 and bad label 115 are then pulled back towards waste rewind reel 730. In this way, apparatus 100 prevents a bad label 115 from being applied to package 750. Apparatus 100 may therefore ensure that only labels 115 that have been properly encoded and/or may be read are applied to packages 750.

After bad label 115 has passed device 130 and bar 150, device 130 may return to its original position, or position of rest, as shown in FIG. 1. Device 130 may be returned to its rest position by application of a reverse signal to a solenoid connected to device 130, as described above.

In another embodiment, device 130 may be returned to its rest position by deactivation of a solenoid connected to device 130, as described above, and by a spring connected to device 130 either driving or pulling device 130 back to its rest position.

In another embodiment, device 130 may be returned to its rest position by any known method, including any mechanical method such as through the use of a spring or air pressure.

Once device 130 has returned to its rest position, peel inhibiting surface 145 is replaced by peeling edge 140 and apparatus 100 may continue to apply labels 115 as described above in accordance with FIG. 1. Device 130 may be linearly driven to peeling edge 140 when necessary to prevent a label 115, bad or otherwise, from being applied to package 750.

In another embodiment of the present invention, the rest position of device 130 may be located at peeling edge 140, as shown in FIG. 2. In such an embodiment, the rest position of device 130 causes peel inhibiting surface 140 to exist and therefore can prevent labels 115 from separating from web 110, as described above. Device 130 may be driven away from its rest position at peeling edge 140 to the position illustrated in FIG. 1. As described above, when device 130 is away from peeling edge 140, labels 115 can separate from web 110 and be applied to a surface of a package, for example. Device 130 may be driven from its rest position at peeling edge 140 by any of the methods described herein.

Figure 5:
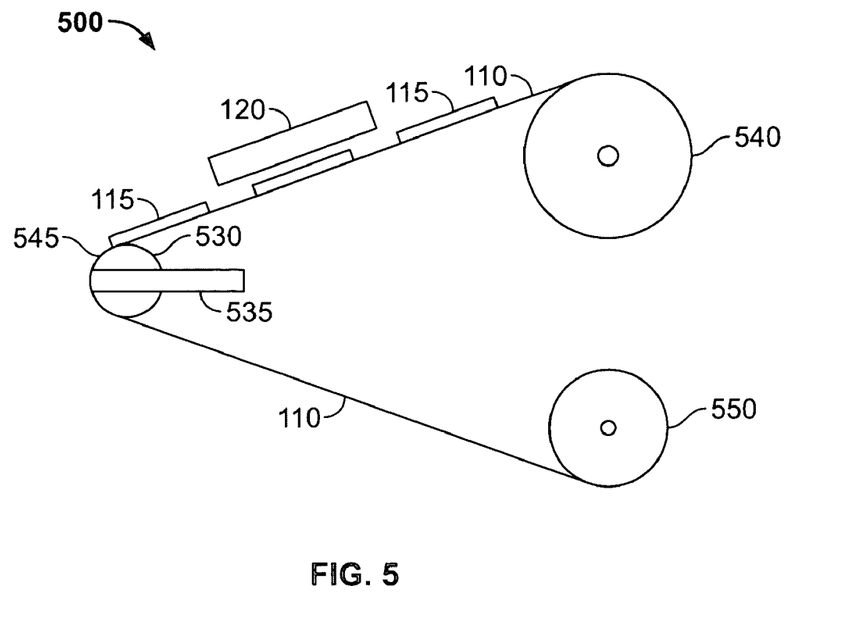
FIG. 5 illustrates a peel inhibitor apparatus of a label applicator system used in accordance with an embodiment of the invention.

FIG. 5 illustrates a peel inhibitor apparatus 500 of label applicator system 700 used in accordance with an embodiment of the invention. Similar to apparatus 100, apparatus 500 may be included in label applicator system 700, as described above. Also similar to apparatus 100, apparatus 500 includes a label web 110, an antenna 120, an unwind spool 540 and a rewind waste spool 550. Either or both of spools 540, 550 may be similar to either or both of spools 710, 730. Apparatus 500 also includes a label reject mechanism 530. Label reject mechanism 530 includes a peel inhibiting device 545 and an extendable peeling edge 535. Peel inhibiting device 545 can include any object with a rounded surface. For example, device 545 can include a cylindrical bar. Edge 535 can include any object with an edge capable of separating a label 115 from web 110. For example, edge 535 can include a rectangular bar or a bar with a square or sharpened edge. Device 545 may include a recess or other cavity capable of receiving edge 535. In other words, device 545 may include a void sufficiently shaped and/or large to include edge 535 within the void, thereby forming a surface when edge 535 is located within device 545.

In operation, web 110 is wound around label unwind spool 540. As described above, unwind spool acts 540 as a supply or source of web 110 and labels 115 to apparatus 100. Web 110 extends from unwind spool 540 to label reject mechanism 530. Web 110 passes over peel inhibiting device 545 and/or peeling edge 535 of mechanism 530 to waste rewind spool 550. Waste rewind spool 550 winds up web 110 for disposal.

As described above in accordance with FIGS. 1 and 2, as web 110 passes under antenna 120, labels 115 may be examined by antenna 120 to determine if a label 115 is good or bad. If a label 115 is a bad label 115, apparatus 500 can prevent the bad label 115 from separating from web 110 and from being applied to a surface of package 750.

After antenna 120 determines that label 115 is bad, web 110 and label 115 continue to be linearly pulled towards peel inhibiting device 545 and peeling edge 535 of mechanism 530. Once web 110 and label 115 are pulled across peel inhibiting device 545 and peeling edge 535, the combination of device 545 and edge 535 forms a surface similar to peel inhibiting surface 145 (as described above in accordance with FIG. 2) that prevents label 115 from separating from web 110. In other words, device 545 and edge 535 may create a geometric shape capable of preventing one or more labels 115 from separating from web 110. For example, device 545 and edge 535 may create a rounded shape, such as a portion of a circle. Bad label 115 may remain adhered to web 110 as web 110 passes across peel inhibiting device 545 and peeling edge 535 of mechanism 530. Web 110 and bad label 115 are then pulled back towards waste rewind reel 550. In this way, apparatus 500 may prevent a bad label 115 from being applied to a surface of package 750. Apparatus 500 may therefore ensure that only labels 115 that have been properly encoded and may be read are applied to packages 750.

Figure 6:
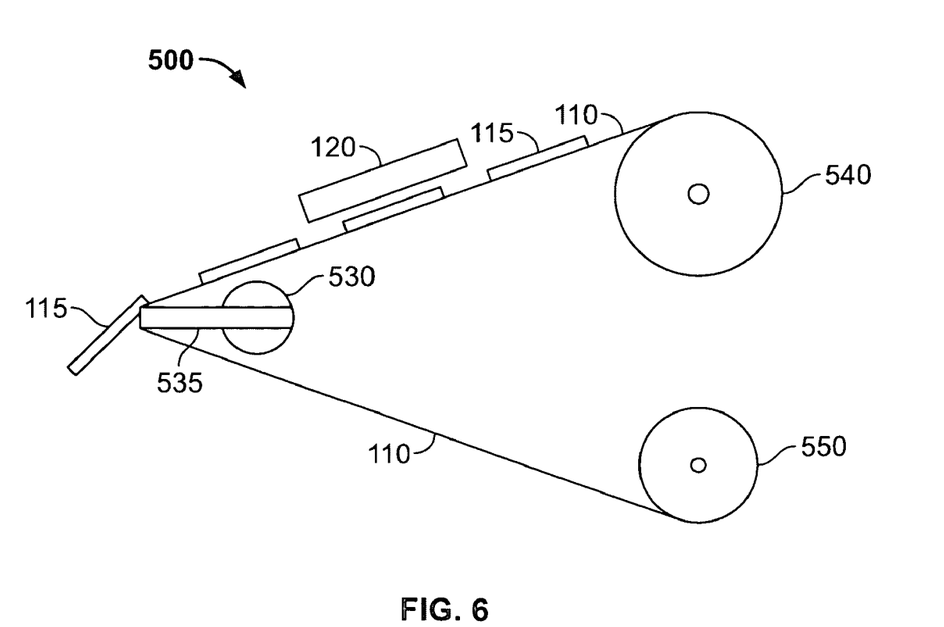
FIG. 6 illustrates the peel inhibitor apparatus of a label applicator system used in accordance with an embodiment of the invention.

FIG. 6 illustrates apparatus 500 of label applicator system 700 used in accordance with an embodiment of the invention. Similar to as described above in accordance with FIG. 1, in order to apply labels 115 to a surface of package 750, web 110 is pulled from unwind spool 540 towards mechanism 530. As web 110 is pulled, web 110 and labels 115 pass under antenna 120.

As labels 115 pass under antenna 120, antenna 120 examines labels 115, as described above. If a label 115 has been properly encoded and is readable, antenna 120 may send a signal to mechanism 530 directing extendable peeling edge 535 to extend outwards, as shown in FIG. 6.

Peeling edge 535 may be extended by any known method, including through the use of a solenoid and an electrical signal. As described above, peeling edge 535 may also be driven by any mechanical method, including through the use of a spring or air pressure. Peeling edge 535 may be driven over a rail guide, as described above. For example, peeling edge 535 may extend out from mechanism 530 by riding along one or more rails.

In an embodiment, peeling edge 535 may include a pair of rail guides and rest on a pair of rails. When antenna 120 determines that a label 115 is good, antenna 120 may send an electrical signal to a solenoid connected to peeling edge 535. Activation of the solenoid may then cause peeling edge 535 to be linearly extended outwards, for example.

Once peeling edge 535 has been extended, the surface formed by the combination of device 545 and edge 535 (similar to peel inhibiting surface 145 that prevents label 115 from separating from web 110, as described above) ceases to exist. Instead, web 110 and label 115 are pulled towards peeling edge 535. Once web 110 and the label 115 reach peeling edge 535, web 110 and label 115 are pulled across edge 535 (and not across a combination of edge 535 and device 545) and then at a sharp or acute angle back towards waste rewind reel 550. Due to the angles that web 110 and label 115 are pulled towards peeling edge 535 and back towards waste rewind reel 550, the good label 115 may be separated from web 110. Once the label 115 is separated from web 110, the label 115 may be adhered to a surface of package 750 passing below apparatus 500, for example.

After label 115 has passed mechanism 530 and peeling edge 535, peeling edge 535 may return to its original position, or position of rest, as shown in FIG. 5. Peeling edge 535 may be returned to its rest position by application of a reverse signal to a solenoid connected to peeling edge 535, as described above, for example.

In another embodiment, peeling edge 535 may be returned to its rest position by deactivation of a solenoid connected to peeling edge 535 and by a spring connected to peeling edge 535 either driving or pulling peeling edge 535 back to its rest position, as described above.

In another embodiment, peeling edge 535 may be returned to its rest position by any known method, including any mechanical method such as through the use of a spring or air pressure.

Once peeling edge 535 has returned to its rest position, apparatus 500 may continue to pass labels 115 over a surface formed by peel inhibiting device 545 and edge 535 as described above in accordance with FIG. 6. Peeling edge 535 may be linearly extended when necessary to cause a label 115 to be separated from web 110 and applied to a surface of package 750.

In another embodiment of the present invention, the rest position of peeling edge 535 may be in an extended position, as shown in FIG. 6. In such an embodiment, the rest position of peeling edge 535 causes labels 115 to separate from web 110, as described above. However, peeling edge 535 may be retracted from its rest position to the position illustrated in FIG. 5 in order to prevent labels 115 from separating from web 110, as described above. Peeling edge 535 may be retracted from its rest position by any of the methods described above. Once peeling edge 535 is retracted from its rest position, web 110 and labels 115 are pulled across peel inhibiting device 545 and edge 535. As web 110 and labels 115 are pulled across device 545 and edge 535, labels 115 remain adhered to web 110, as described above.

In an embodiment, the surface formed by device 545 and edge 535 includes a radius that is constant over the periphery of the surface formed by device 545 and edge 535.

In another embodiment, the surface formed by device 545 and edge 535 includes a radius that is not constant over the periphery of the surface formed by device 545 and edge 535.

Figure 3:
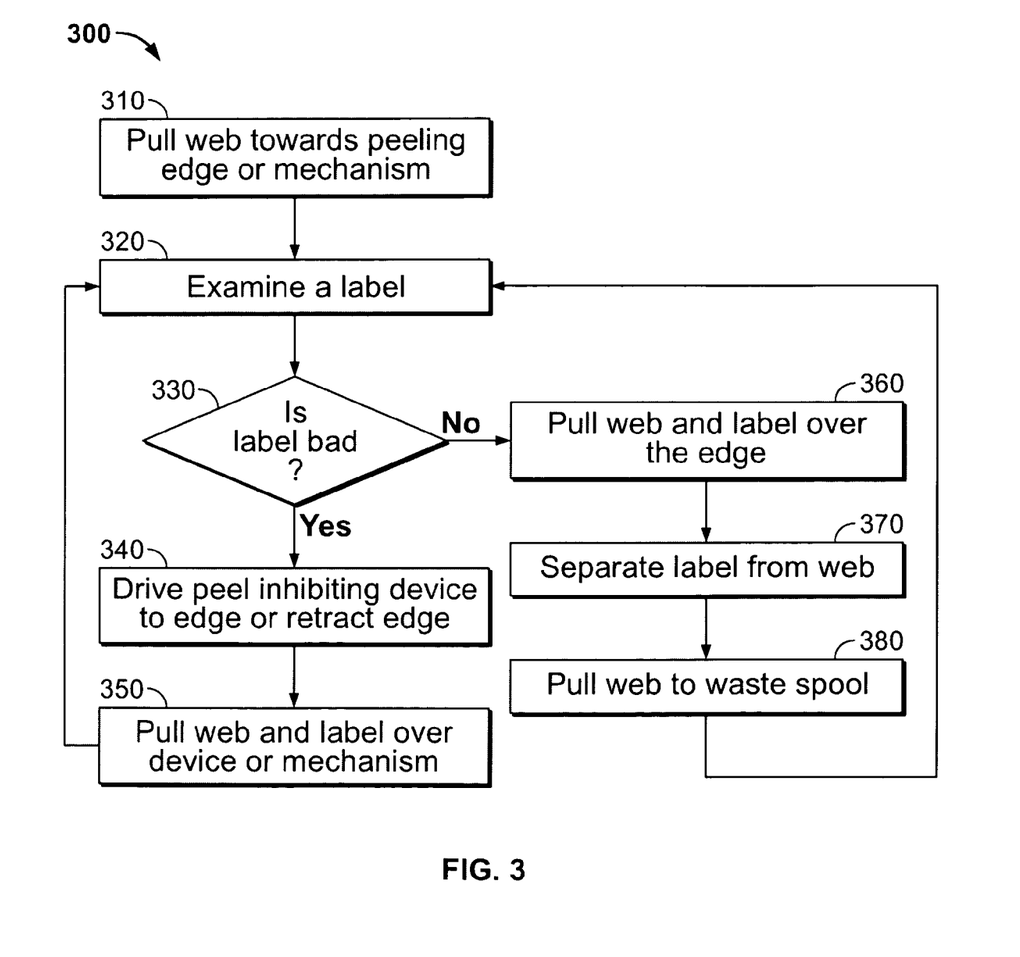
FIG. 3 illustrates a flowchart of a method for inhibiting peeling of labels from a web in accordance with an embodiment of the present invention.

FIG. 3 illustrates a flowchart of a method 300 for inhibiting peeling of labels from a web in accordance with an embodiment of the present invention. First, at step 310, web 110 and a plurality of labels 115 are pulled towards a peeling edge 140, 535. As described above, web 110 and labels 115 may be supplied by an unwind spool 710. Waste rewind spool 730 may pull web 110 or a separate drive spool adjacent to the rewind spool 730 may pull web 110 onto rewind spool 730, as described above.

Next, at step 320, at least one label 115 is examined. The examination of label 115 includes at least one of determining whether information stored on or in label 115 may be read (for example, whether label 115 responds to a received read signal with a proper response signal) and whether label 115 has been properly encoded, as described above.

Next, at step 330, the determination is made as to whether label 115 is bad or good. A bad label 115, as described above, is a label 115 that has either been improperly encoded and/or is incapable of being read by antenna 120. On the other hand, a good label 115 is a label 115 that has been properly encoded and/or is capable of being read by antenna 120. If label 115 is determined to be a bad label 115, the method 300 proceeds to step 340.

At step 340, a peel inhibiting surface is formed. In one embodiment, the peel inhibiting surface is formed by moving peel inhibiting device 130 to peeling edge 140, thus forming a peel inhibiting surface 145.

In another embodiment, at step 340 the peel inhibiting surface is formed by retracting peeling edge 535 into mechanism 530. Once edge 535 is retracted, a combination of edge 535 and device 545 form a peel inhibiting surface, as described above.

Next, at step 350, web 110 and label 115 are pulled over the peel inhibiting surface. The peel inhibiting surface (created by surface 145 or combination of edge 535 and surface 545) prevents label 115 from separating from web 110. Web 110 and label 115 are then pulled towards the waste rewind reel. In this way, method 300 may prevent a bad label 115 from being applied to a surface of package 750.

Method 300 next proceeds back to step 320 for a subsequent label 115 on web 110. Method 300 therefore forms a method loop for apparatus 100 whereby each label 115 found to be bad at steps 320, 330 causes a peel inhibiting surface to be formed over which web 110 and bad label 115 is pulled. The peel inhibiting surface prevents bad label 115 from being separated from web 110 and applied to a surface.

However, if at step 330 it is determined that label 115 is not a bad label 115, method 300 proceeds to step 360. At step 360, web 110 and label 115 are pulled towards and over peeling edge 140, 535 As described above, at step 370, once web 110 and label 115 reach edge 140, 535, label 115 may be separated from web 110. Once the label 115 is separated from web 110, the label 115 may be adhered to a surface of a package 750 passing below apparatus 100, 500, for example.

Next, at step 380, once label 115 has been separated from web 110, web 110 is pulled to the waste rewind spool 730 for disposal. The method 300 then proceeds back to step 320 for the subsequent label 115 on web 110. Method 300 therefore forms a second method loop for apparatus 100 whereby each label 115 found to be properly encoded and readable at steps 320, 330 is pulled across edge 140, 535 (step 360), thereby causing label 115 to separate from web 110 (step 370).

Method 300 thus may proceed for apparatus 100 by examining several labels 115 adhered to web 110 and forming a peel inhibiting surface to prevent bad labels 115 from separating from web 110 or causing good labels 115 to be separated from web 110 by pulling good labels 115 and web 110 across a peeling edge 140, 545.

Figure 4:
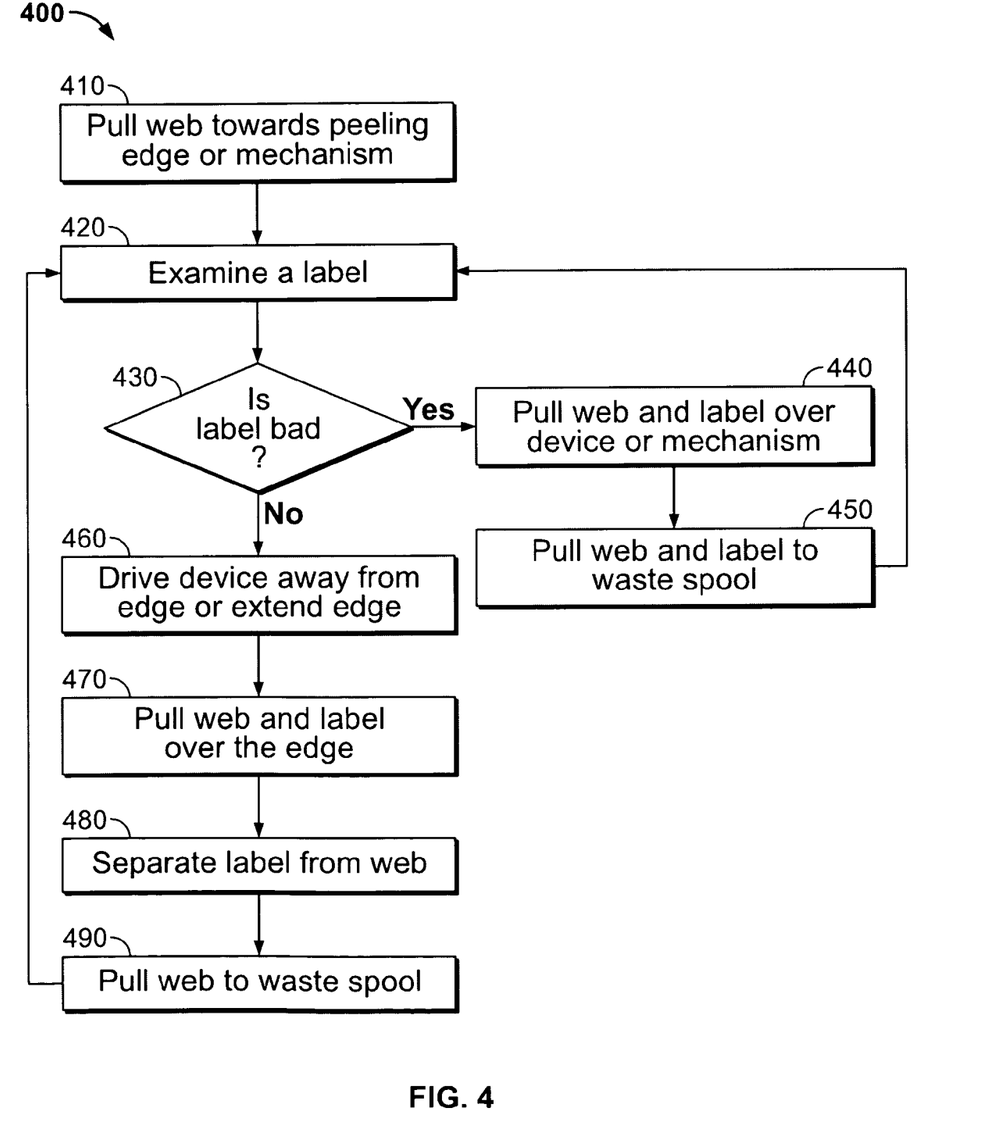
FIG. 4 illustrates a flowchart of a method for inhibiting peeling of labels from a web in accordance with an embodiment of the present invention.

FIG. 4 illustrates a flowchart of a method 400 for inhibiting peeling of labels from a web in accordance with an embodiment of the present invention. First, at step 410 web 110 and a plurality of labels 115 are pulled towards a peel inhibiting surface (formed by surface 145 or a combination of device 535 and edge 545, as described above).

Next, at step 420, antenna 120 examines at least one label 115. The examination of label 115 includes at least one of determining whether label 115 may be read from (for example, whether label 115 responds to a received read signal with a proper response signal) and whether label 115 has been properly encoded, as described above.

Next, at step 430, the determination is made as to whether label 115 is bad or good. A bad label 115, as described above, is a label 115 that has either been improperly encoded and/or is incapable of being read by antenna 120, for example. On the other hand, a good label 115 is a label 115 that has been properly encoded and/or is capable of being read by antenna 120, for example. If label 115 is determined to be a bad label 115, the method 400 proceeds to step 440.

Next, at step 440, web 110 is pulled over the peel inhibiting surface. In one embodiment, the peel inhibiting surface 145 is formed by device 130 and bar 150. As described above, if the rest position of device 130 is at edge 140, then device 130 forms peel inhibiting surface 145 with bar 150 (unless device 130 is then driven away from edge 140).

In another embodiment, the peel inhibiting surface is formed by device 545 and edge 535. As described above, if peeling edge 535 is retracted within mechanism 530, then mechanism 530 includes a peel inhibiting surface formed by device 545 and edge 535.

The peel inhibiting surface prevents label 115 from separating from web 110. Label 115 therefore remains adhered to web 110 as web 110 passes over the peel inhibiting surface formed by a combination of device 130 and bar 150 in one embodiment and a combination device 545 and edge 535 in another embodiment.

Next, at step 450, web 110 and label 115 are pulled towards the waste rewind reel 730.

Method 400 next proceeds back to step 420 for a subsequent label 115 on web 110. Method 400 therefore forms a method loop where each label 115 found to be bad at steps 320, 330 causes web 110 and bad label 115 to be pulled over a peel inhibiting surface (step 440), thereby keeping bad label 115 adhered to web 110 as it is pulled back to the rewind spool 730 (step 450).

However, if at step 430 it is determined that label 115 is not a bad label 115, then method 400 proceeds to step 460. In one embodiment, at step 460, device 130 is driven away from edge 140, as described above. By driving device 130 away from edge 140, peel inhibiting surface 145 formed by device 130 and bar 150 is removed from the path of web 110.

In another embodiment, at step 460, peeling edge 535 is extended away from device 545, as described above. By extending peeling edge 535, the peel inhibiting surface formed by edge 535 and device 545 is removed from the path of web 110 and labels 115.

Next, at step 470, web 110 and label 115 are pulled towards and over the peeling edge 140, 535.

Next, at step 480, once web 110 and label 115 reach the peeling edge 140, 535, label 115 may be separated from web 110, as described above. Once the label 115 is separated from web 110, the label 115 may be adhered to a surface of a package 750, for example.

Next, at step 490, web 110 is pulled to the rewind waste spool 730 for disposal. The method 400 then proceeds back to step 420 for a subsequent label 115 on web 110. Method 400 therefore forms a second method loop whereby each label 115 found to be properly encoded and readable at steps 420, 430 is pulled across a peeling edge 140, 535 (step 470), thereby causing label 115 to separate from web 110 (step 480).

Method 400 thus may proceed for apparatus 100 by examining several labels 115 adhered to web 110 and either forming a peel inhibiting surface or a peeling edge. If a label is determined to be a good label, the label and web are pulled across the peeling edge. If a label is determined to be a bad label, the label and web are pulled across the peel inhibiting surface. In this way, method 400 may provide for a reduction in the number of bad labels 115 that are applied to a surface of a package 750.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A peel inhibiting apparatus for inhibiting peeling of labels from a web, said apparatus comprising:
   a peeling edge including an elongated acute corner surface and a first half-cylinder bar having a first radius, said elongated acute corner surface configured to separate said labels from said web when said web is pulled across said elongated acute corner surface; and
   a peel inhibiting device including a second half-cylinder bar having a second radius, wherein at least one of said peeling edge and said peel inhibiting device is configured to move towards the other so that said first and second half-cylinder bars form a peel inhibiting surface, said peel inhibiting surface configured to prevent said labels from separating from said web when said web is pulled across at least a portion of said first and second radii of said first and second half-cylinder bars.

2. The apparatus of claim 1, wherein said peel inhibiting device includes a rounded surface and a cavity, said peeling edge capable of residing within said cavity,
wherein said device and said edge form said peel inhibiting surface when said peeling edge is located within said peel inhibiting device.

3. The apparatus of claim 1, wherein said peel inhibiting device is configured to be driven towards and/or away from said peeling edge based on a determination of whether one or more of said labels has been properly encoded.

4. The apparatus of claim 3, wherein said determination is made by the following steps:
transmitting an encode signal to one or more of said labels;
transmitting a read signal to one or more of said labels, said labels transmitting a response signal when said read signal is received at one or more of said labels;
receiving said response signal; and
verifying whether said response signal includes one or more indications of proper encoding of one or more of said labels.

5. The apparatus of claim 3, wherein said peel inhibiting device is configured to be linearly driven towards and/or away from said peeling edge by at least one of a solenoid and a spring.

6. The apparatus of claim 1, wherein said peeling edge is configured to be driven towards and/or away from said peel inhibiting device based on a determination of whether one or more of said labels has been properly encoded.

7. The apparatus of claim 6, wherein said determination is made by the following steps:
transmitting an encode signal to one or more of said labels;
transmitting a read signal to one or more of said labels, said labels transmitting a response signal when said read signal is received at one or more of said labels;
receiving said response signal; and
verifying whether said response signal includes one or more indications of proper encoding of one or more of said labels.

8. The apparatus of claim 6, wherein said peel inhibiting device is configured to be linearly driven towards and/or away from said peeling edge by at least one of a solenoid and a spring.

9. A method for inhibiting peeling of one or more labels from a web, said method comprising:
pulling said web towards a peeling edge, said web including a plurality of said labels adhered to said web, said peeling edge including an upper surface; and
inhibiting separation of one or more of said labels from said web by forming a peel inhibiting surface, at least a portion of said peel inhibiting surface positioned between said upper surface of said peeling edge and said web.

10. The method of claim 9, wherein said inhibiting step includes moving a peel inhibiting device to said peeling edge to form said peel inhibiting surface.

11. The method of claim 10, wherein said peeling edge includes a first half-cylinder bar forming a first radius and said peel inhibiting device includes a second half-cylinder bar forming a second radius, said first and second bars configured to form said peel inhibiting surface when said second bar is driven to said first bar.

12. The method of claim 9, further including examining one or more of said labels for proper encoding.

13. The method of claim 12, wherein said examining step includes:
transmitting an encode signal to one or more of said labels;
transmitting a read signal to one or more of said labels, said labels transmitting a response signal when said read signal is received at one or more of said labels;
receiving said response signal; and
verifying whether said response signal includes one or more indications of proper encoding of one or more of said labels.

14. The method of claim 13, wherein said inhibiting step occurs when one or more of said labels are determined to not have proper encoding during said examining step.

15. A method for inhibiting peeling of one or more labels from a web, said method comprising:
pulling said web towards a peeling edge, said web including a plurality of said labels adhered to said web; and
inhibiting separation of one or more of said labels from said web by forming a peel inhibiting surface at said peeling edge, wherein said inhibiting step includes retracting said peeling edge within a peel inhibiting device to form said peel inhibiting surface, said peel inhibiting device including a rounded surface and a cavity.

16. A system for applying labels, said system comprising:
an antenna configured to examine at least one of said labels adhered to a web for proper encoding; and
a peel inhibit apparatus configured to separate properly encoded labels from said web and to prevent improperly encoded labels from said web based on an examination of said labels by said antenna, said peel inhibit apparatus including a peel inhibiting device and a peeling edge, said peeling edge including an upper surface,
wherein at least one of said device and said edge is configured to move towards the other in order create a rounded surface capable of preventing improperly encoded labels from separating from said web, at least a portion of said rounded surface being positioned between said upper surface of said peeling edge and said web.

17. The system of claim 16, wherein said device is configured to move towards said edge in order to create said rounded surface.

18. The system of claim 16, wherein said antenna is configured to encode said labels with identification information.

19. A system for applying labels, said system comprising:
an antenna configured to examine at least one of said labels adhered to a web for proper encoding; and
a peel inhibit apparatus configured to separate properly encoded labels from said web and to prevent improperly encoded labels from said web based on an examination of said labels by said antenna, said peel inhibit apparatus including a peel inhibiting device and a peeling edge,
wherein at least one of said device and said edge is configured to move towards the other in order create a rounded surface capable of preventing properly encoded labels from separating from said web, wherein said edge is configured to move towards said device in order to create said rounded surface.

* * * * *